US012718689B2

(12) United States Patent
Xu et al.

(10) Patent No.: US 12,718,689 B2
(45) Date of Patent: Aug. 25, 2026

(54) METHOD AND APPARATUS FOR VERIFYING A ROAD WORK EVENT

(71) Applicant: HERE Global B.V., Eindhoven (NL)

(72) Inventors: Jingwei Xu, Buffalo Grove, IL (US); Yuxin Guan, Chicago, IL (US); Weimin Huang, Chicago, IL (US); Bruce Bernhardt, Wauconda, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/108,225

(22) Filed: Dec. 1, 2020

(65) Prior Publication Data

US 2022/0172616 A1 Jun. 2, 2022

(51) Int. Cl.

| | |
|---|---|
| ***G08G 1/0967*** | (2006.01) |
| ***B60W 60/00*** | (2020.01) |
| ***G01C 21/00*** | (2006.01) |
| ***G01C 21/32*** | (2006.01) |
| ***G01C 21/34*** | (2006.01) |

(Continued)

(52) U.S. Cl.

CPC ..... *G08G 1/096725* (2013.01); *B60W 60/001* (2020.02); *G01C 21/32* (2013.01); *G01C 21/3461* (2013.01); *G01C 21/3492* (2013.01); *G01C 21/3691* (2013.01); *G01C 21/3815* (2020.08); *G08G 1/0125* (2013.01);

(Continued)

(58) Field of Classification Search

CPC ......... G08G 1/00; G08G 1/0104–0145; G08G 1/0962–0969; G01C 21/00; G05D 1/0088; G05D 1/00; B60W 60/00; G06Q 50/30–32; G06Q 50/40–47; G07C 5/00

USPC ...................................... 701/23–28, 400–541

See application file for complete search history.

(56) References Cited

U.S. PATENT DOCUMENTS

| | | | |
|---|---|---|---|
| 9,221,461 B2 | 12/2015 | Ferguson et al. |
| 9,575,490 B2 | 2/2017 | Ferguson et al. |

(Continued)

FOREIGN PATENT DOCUMENTS

CN 111343582 A * 6/2020 ............ B60W 40/00

OTHER PUBLICATIONS

Yuan Y—English Claims and Description of CN-111343582-A via Espacenet Patent Translate, retrieved Apr. 13, 2022. (Year: 2022).*

(Continued)

*Primary Examiner* — Erin M Piateski
*Assistant Examiner* — Paul Allen
(74) *Attorney, Agent, or Firm* — ALSTON & BIRD LLP

(57) ABSTRACT

A method, apparatus and computer program product for determining a road work event confidence are described herein. In the context of a method, the method may determine a road network speed profile corresponding with a road work event location. The method may determine, based at least in part on probe data corresponding with the road work event location, a probe speed profile. The method may determine the road work event confidence based at least in part on evaluation of the road network speed profile and the probe speed profile. Evaluation of the road network speed profile and the probe speed profile may comprise identifying a plurality of road segments corresponding with the road work event location and correlating road network speed profile characteristics and probe data characteristics for each respective road segment.

17 Claims, 7 Drawing Sheets

(51) Int. Cl.

| | |
|---|---|
| ***G01C 21/36*** | (2006.01) |
| ***G08G 1/01*** | (2006.01) |
| ***G08G 1/0969*** | (2006.01) |

(52) U.S. Cl.

CPC ......... *G08G 1/0145* (2013.01); *G08G 1/0969* (2013.01); *B60W 2555/60* (2020.02)

(56) References Cited

U.S. PATENT DOCUMENTS

| | | | | |
|---|---|---|---|---|
| 2013/0275033 | A1* | 10/2013 | Bastiaensen | G01C 21/26 701/119 |
| 2014/0309833 | A1* | 10/2014 | Ferguson | G06K 9/00818 701/23 |
| 2015/0266471 | A1* | 9/2015 | Ferguson | B25J 9/1697 701/23 |
| 2016/0042239 | A1* | 2/2016 | Fowe | G06T 7/20 382/104 |
| 2016/0170414 | A1* | 6/2016 | Chen | G05D 1/0221 701/27 |
| 2016/0217337 | A1* | 7/2016 | Fowe | G08G 1/0112 |
| 2016/0379488 | A1* | 12/2016 | Fowe | G08G 1/0112 701/119 |
| 2017/0242436 | A1 | 8/2017 | Creusot | |
| 2017/0270377 | A1* | 9/2017 | Fotta | G06K 9/00818 |
| 2018/0079416 | A1* | 3/2018 | Damman | B60W 30/188 |
| 2018/0151066 | A1* | 5/2018 | Oba | G01C 21/3407 |
| 2018/0365507 | A1 | 12/2018 | Hackeloeer et al. | |
| 2019/0066498 | A1* | 2/2019 | Baldwin | B60W 30/09 |
| 2019/0205674 | A1* | 7/2019 | Silver | G05D 1/0088 |
| 2019/0259208 | A1* | 8/2019 | Yaqub | G08G 1/093 |
| 2020/0042807 | A1 | 2/2020 | Schutzmeier et al. | |
| 2020/0180610 | A1* | 6/2020 | Schneider | B60W 40/04 |
| 2020/0180639 | A1* | 6/2020 | Mizoguchi | G05D 1/0214 |
| 2020/0192386 | A1 | 6/2020 | Stenneth | |
| 2020/0193194 | A1* | 6/2020 | Zhang | G06F 18/217 |
| 2020/0193809 | A1* | 6/2020 | Zhang | G08G 1/096775 |
| 2020/0193823 | A1 | 6/2020 | Zhang et al. | |
| 2020/0302195 | A1* | 9/2020 | Thelen | G08G 1/09623 |
| 2020/0364473 | A1* | 11/2020 | Silver | B60W 40/105 |
| 2021/0142659 | A1* | 5/2021 | Chen | G08G 1/0141 |
| 2022/0011120 | A1* | 1/2022 | St. Romain | G08G 1/096741 |

OTHER PUBLICATIONS

Roadworks—Wikipedia [online] [Retrieved Mar. 17, 2021]. Retrieved from the Internet: <URL:https://en.wikipedia.org/w/index.php?title=Roadworks&oldid=989174731>. (dated Nov. 17, 2020), 2 pages.

Road Traffic Control—Wikipedia [online] [Retrieved Mar. 17, 2021]. Retrieved from the Internet: <URL:https://en.wikipedia.org/w/index.php?title=Road_traffic_control&oldid=9 88459658>. (dated Nov. 13, 2020), 6 pages.

* cited by examiner

60
STATIONARY
SENSOR
20
50
40
10
20

METHOD AND APPARATUS FOR VERIFYING A ROAD WORK EVENT

TECHNOLOGICAL FIELD

Example embodiments relate generally to a method, apparatus and computer program product for determining a road work event confidence and causing publication of information corresponding with the road work event based on the road work event confidence.

BACKGROUND

A road work event may require closure of at least a portion of a road. A road work event location may be identified from a variety of sources (e.g., publicly available information, vehicle sensor data, image data, traffic service providers and/or the like). Corresponding road work event information (e.g., warnings) may subsequently be published (e.g., transmitted for display in conjunction with a mapping or navigation system).

In some cases, published road work event information (e.g., warnings) may be inaccurate or outdated. This inaccuracy may lead to drivers placing less confidence in such road work event warnings, thereby potentially devaluing these warnings. Additionally, there is a need for more detailed road work event information (e.g., lane level information corresponding with the road work event location) to improve and augment (e.g., dynamically update) navigation, mapping and autonomous driving systems.

BRIEF SUMMARY

A method, apparatus and computer program product are provided for determining a road work event confidence, and providing road work event information in an instance in which the road work event is verified (e.g., satisfies a road work event confidence). By verifying road work events, publication of false positive road work events can be suppressed. Further, detailed road work information can be provided (e.g., lane level information corresponding with the road work event location). As a result, the likelihood that the road work events that are published accurately identify a road work event is increased, thereby giving drivers greater confidence in such warnings.

In an example embodiment, a computer-implemented method for determining a road work event confidence is provided. The method comprises determining a road network speed profile. The method comprises determining, based at least in part on probe data corresponding with the road work event location, a probe speed profile. The method comprises determining the road work event confidence based at least in part on evaluation of the road network speed profile and the probe speed profile.

Evaluating the road network speed profile and the probe speed profile may comprise identifying a plurality of road segments corresponding with the road work event location and correlating road network speed profile characteristics and probe data characteristics for each respective road segment. The road network speed profile characteristics may comprise dynamic speed limit sign data and the probe data characteristics may comprise one or more of geolocation data, heading data, speed data or timestamp data. The method may further comprise map matching at least a portion of the probe data with geographic data in order to determine lane level information corresponding with the road work event location. The method may further comprise causing an autonomous vehicle to proceed in a lane that remains open or subject to a reduced speed limit in a vicinity of the road work event location in an instance in which the road work event confidence satisfies a confidence threshold. The method may further comprise causing transmission of road work event information corresponding with the road work event location for updating a mapping or navigation system in an instance in which the road work event confidence satisfies a confidence threshold. The method may further comprise, in response to determining that the road work event confidence fails to satisfy a threshold confidence, causing deactivation of a road work event warning associated with the road work event location.

In yet another example embodiment, an apparatus configured to determine a road work event confidence is provided. The apparatus includes means for determining a road network speed profile. The apparatus also includes means for determining, based at least in part on probe data corresponding with the road work event location, a probe speed profile. The apparatus also includes means for determining the road work event confidence based at least in part on evaluation of the road network speed profile and the probe speed profile.

The apparatus may further include means for evaluating the road network speed profile and the probe speed profile by identifying a plurality of road segments corresponding with the road work event location and correlating road network speed profile characteristics and probe data characteristics for each respective road segment. The road network speed profile characteristics may comprise dynamic speed limit sign data and the probe data characteristics may comprise one or more of geolocation data, heading data, speed data or timestamp data.

The means for determining the probe speed profile may include means for map matching at least a portion of the probe data with geographic data in order to determine lane level information corresponding with the road work event location. The means for determining the road work event confidence may include means for causing an autonomous vehicle to proceed in a lane that remains open or subject to a reduced speed limit in a vicinity of the road work event location in an instance in which the road work event confidence satisfies a confidence threshold. The means for determining the road work event confidence may include means for transmitting road work event information corresponding with the road work event location for updating a mapping or navigation system in an instance in which the road work event confidence satisfies a confidence threshold. The means for determining the road work event confidence may include means for, in response to determining that the road work event confidence fails to satisfy a threshold confidence, causing deactivation of a road work event warning associated with the road work event location.

In a further example embodiment, a computer program product may be configured to determine a road work event confidence. The computer program product may comprise at least one non-transitory computer readable storage medium having computer-executable program code instructions stored therein with the computer-executable program code instructions including program code instructions configured, upon execution, to determine a road network speed profile corresponding with a road work event location; determine, based at least in part on probe data corresponding with the road work event location, a probe speed profile; and determine the road work event confidence based at least in part on evaluation of the road network speed profile and the probe speed profile.

The program code instructions may also be configured, upon execution, to evaluate the road network speed profile and the probe speed profile by identifying a plurality of road segments corresponding with the road work event location and correlating road network speed profile characteristics and probe data characteristics for each respective road segment. The road network speed profile characteristics may comprise dynamic speed limit sign data and the probe data characteristics may comprise one or more of geolocation data, heading data, speed data ortimestamp data. The program code instructions may also be configured, upon execution, to: map match at least a portion of the probe data with geographic data in order to determine lane level information corresponding with the road work event location. The program code instructions may also be configured, upon execution, to cause an autonomous vehicle to proceed in a lane that remains open or subject to a reduced speed limit in a vicinity of the road work event location in an instance in which the road work event confidence satisfies a confidence threshold. The program code instructions may also be configured, upon execution, to cause transmission of road work event information corresponding with the road work event location for updating a mapping or navigation system in an instance in which the road work event confidence satisfies a confidence threshold. The program code instructions may also be configured, upon execution, to in response to determining that the road work event confidence fails to satisfy a threshold confidence, cause deactivation of a road work event warning associated with the road work event location.

BRIEF DESCRIPTION OF THE DRAWINGS

Figure 1:
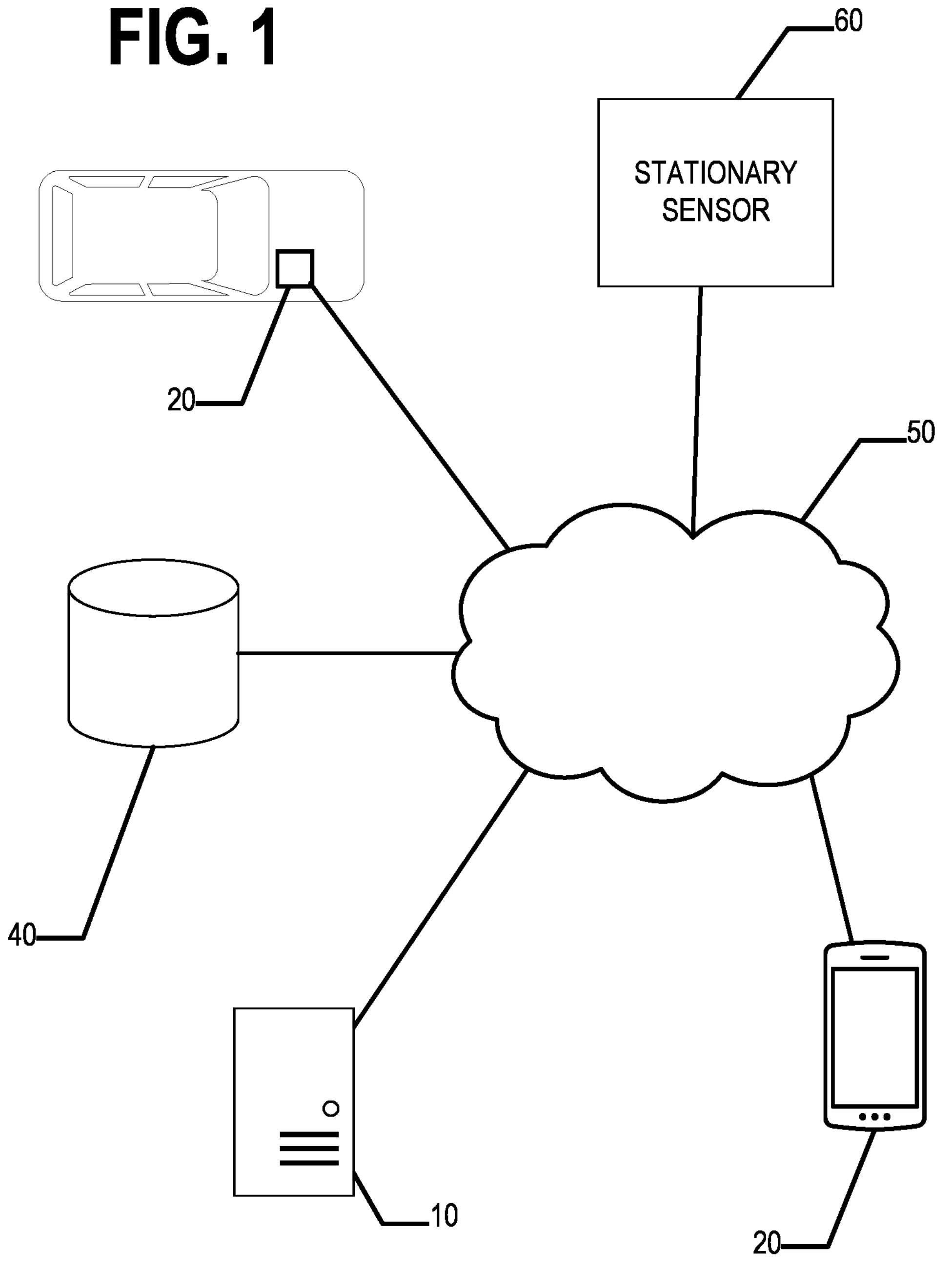
Figure 2A:
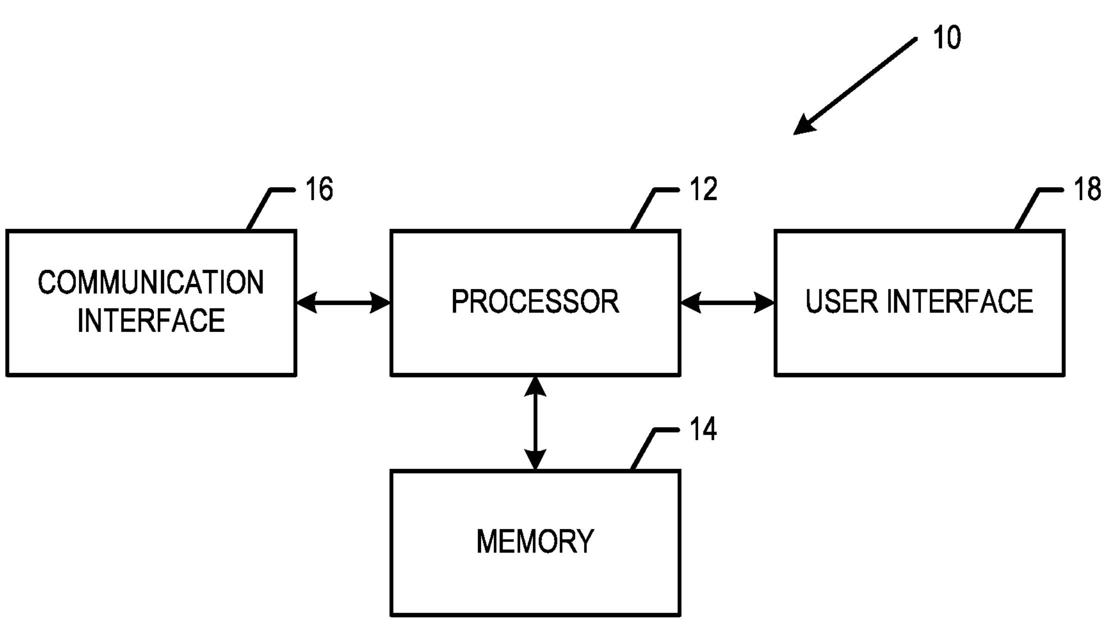
Figure 2B:
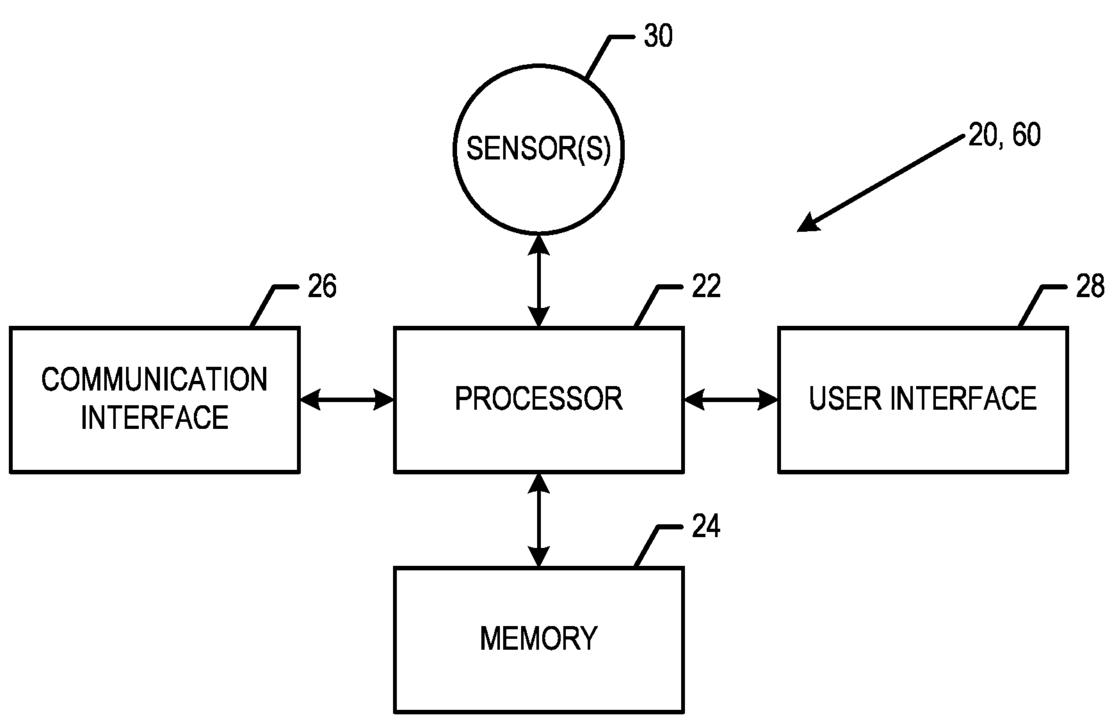
Figure 3:
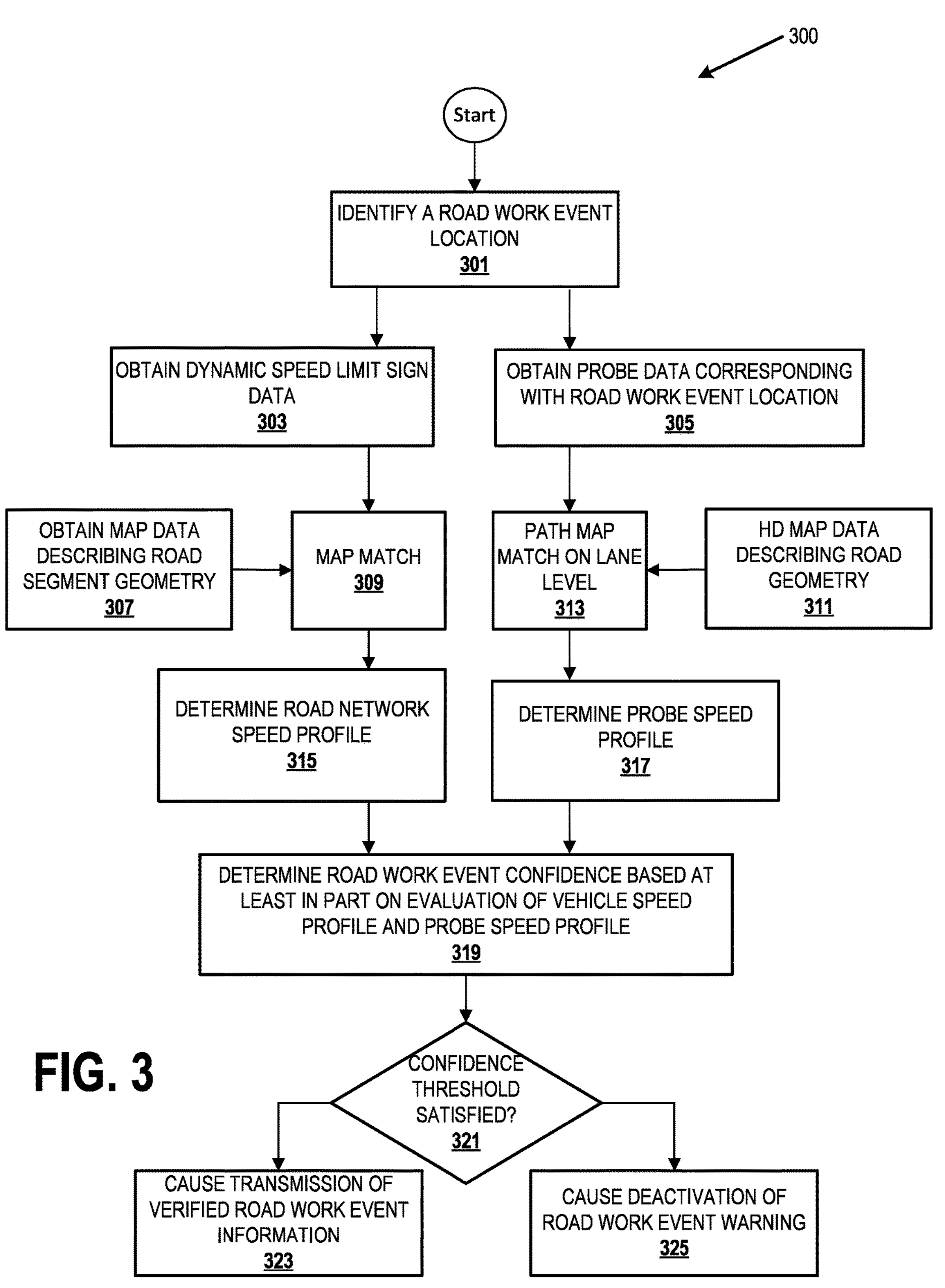
Figure 4:
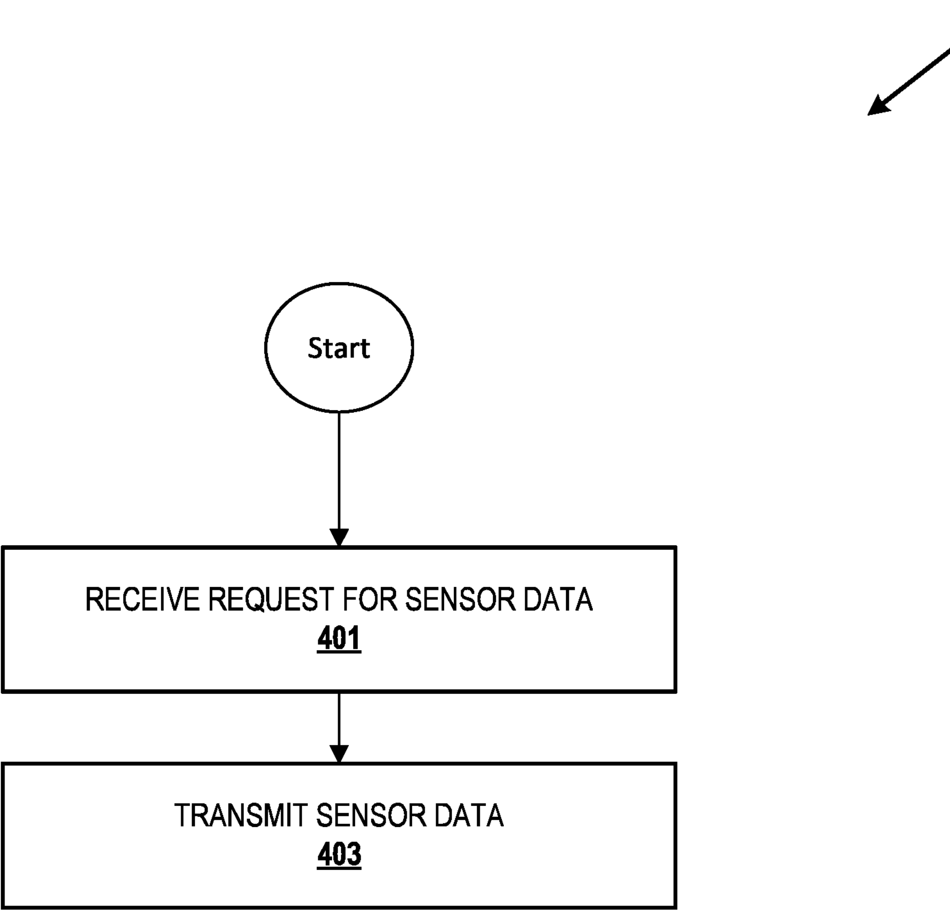
Figure 5:
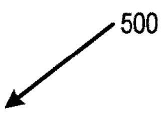
Figure 5:
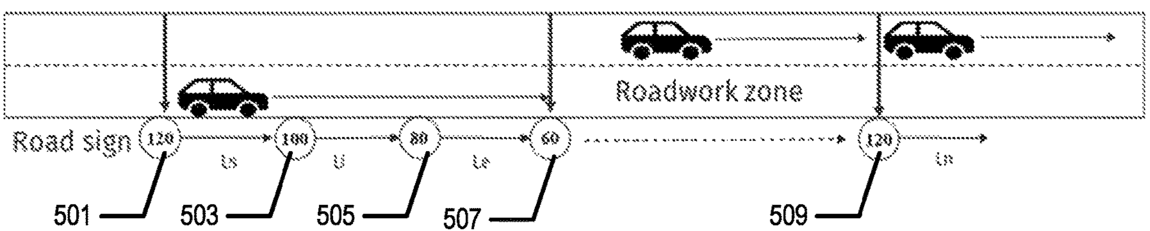
Figure 6:
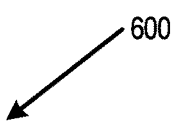
Figure 6:
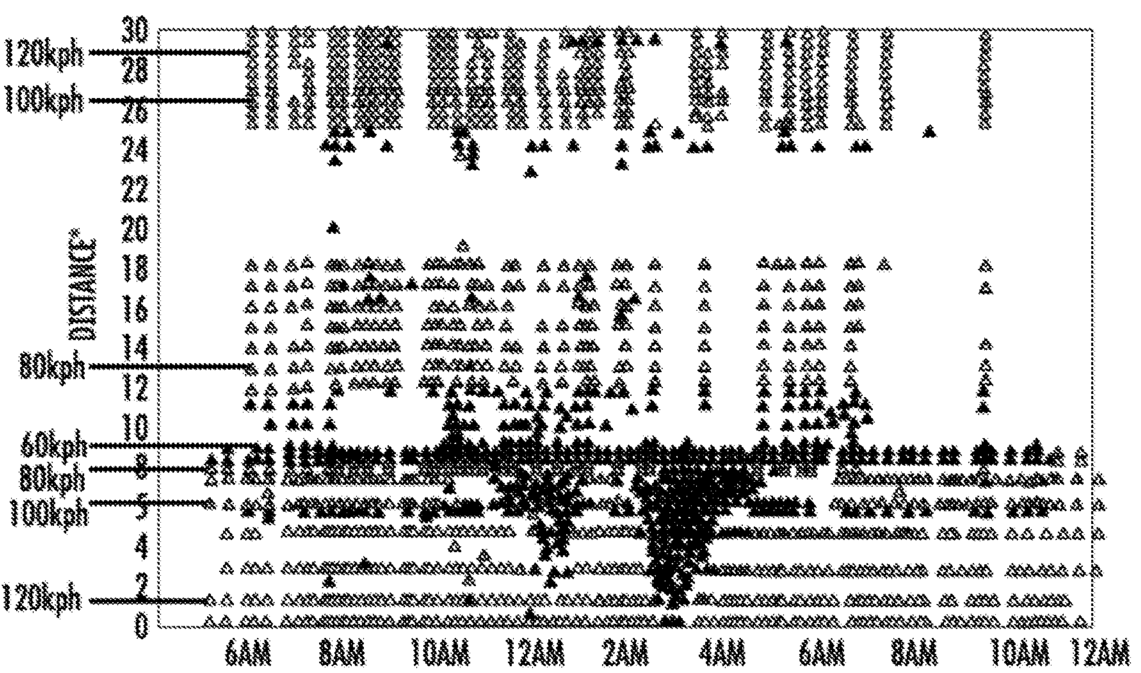

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a computing entity that may be specifically configured in accordance with an example embodiment;

FIG. 2B is a block diagram of an apparatus that may be specifically configured in accordance with an example embodiment;

FIG. 3 is a flowchart illustrating operations performed, such as by the computing entity of FIG. 2A, in accordance with an example embodiment;

FIG. 4 is a flowchart illustrating operations performed, such as by the apparatus of FIG. 2B, in accordance with an example embodiment;

FIG. 5 is an example schematic in accordance with an example embodiment; and FIG. 6 is an example schematic in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

A method, apparatus and computer program product for determining a road work event confidence for a location are described herein. Though many of the embodiments are described in the context of a road work event, the method, apparatus and computer program product may be utilized to determine an event confidence for other road conditions such as weather events, slippery roads, accidents, disabled vehicles and the like.

FIG. 1 provides an illustration of an example system that can be used in conjunction with various embodiments of the present invention. As shown in FIG. 1, the system may include one or more vehicle apparatuses 20, one or more computing entities 10 (e.g., servers), one or more sensing apparatuses 60, one or more networks 50, and/or the like. In various embodiments, the vehicle apparatus 20 may be an in-vehicle navigation system, vehicle control system, a mobile computing device, and/or the like. For example, a vehicle apparatus 20 may be an in-vehicle navigation system mounted within and/or on-board a vehicle such as a motor vehicle, automobile, car, scooter, truck, van, bus, motorcycle, bicycle, segway, golf cart, and/or the like, a non-motor vehicle, etc. In other embodiments, the vehicle apparatus 20 may be a smartphone, tablet, personal digital assistant (PDA), and/or other mobile computing device. In various embodiments, the one or more sensing apparatuses 60 may be similar to and/or comprise similar components to the vehicle apparatus 20.

As depicted in FIG. 2A, the computing entity 10 may comprise a processor 12, memory 14, and optionally a user interface 18, a communications interface 16, and/or other components configured to perform various operations, procedures, functions or the like described herein. In one example, the computing entity 10 may include an application processor, an image processor, or any other suitable processing means required for functioning of the computing entity 10. While FIG. 2A depicts a single processor, additional processors/processing devices may be included. The processor may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, the processor may include any suitable type of single or multi-core processor, microcontroller, central processing unit, and/or the like. Any of the processing devices disclosed herein may be configured to perform certain functions. Configuring a processing device, such as any of the described processors, controllers or microprocessor, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

In example embodiments, a computing entity 10 may be in communication with the vehicle apparatus 20 and/or sensing apparatus 60. In various embodiments, the computing entity 10 may be located remotely from the vehicle apparatus 20 and/or sensing apparatus 60, while in other embodiments, the computing entity 10, the vehicle apparatus 20 and/or the sensing apparatus 60 may be collocated, such as within a vehicle. Each of the components of the system, including one or more vehicle apparatuses 20, one or more sensing apparatuses 60 and one or more computing entities 10, may be in communication with one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 or sensing apparatus 60 may be in communication with a computing entity 10 via the network 50 and/or via the Cloud. Similarly, the vehicle apparatus 20 and the sensing apparatus 60 may comprise the same/similar components to those shown in FIG. 2A.

As depicted in FIG. 2B, the vehicle apparatus 20 and the sensing apparatus 60 may each comprise a processor 22, memory 24, a communications interface 26, a user interface 28, one or more sensors 30 (e.g., a location sensor such as a global positioning system (GPS) sensor; camera(s); two dimensional (2D) and/or three dimensional (3D) light detection and ranging (LiDAR) sensor(s); long, medium, and/or short range radio detection and ranging (RADAR) sensor(s); ultrasonic sensors; electromagnetic sensors; (near-) infrared (IR) cameras, 3D cameras, 360° cameras, accelerometer(s), gyroscope(s), and/or other sensors that enable the vehicle apparatus 20 and sensing apparatus 60 to determine one or more features of the corresponding location and/or vehicle's surroundings), and/or other components configured to perform various operations, procedures, functions or the like described herein. Similarly, example embodiments of the computing entity 10, vehicle apparatus 20 and sensing apparatus 60 are described in more detail below with respect to FIGS. 2A and 2B.

II. Example Operations

In example embodiments, the computing entity 10 may be configured to identify a road work event location. In such embodiments, the computing entity 10 may obtain (e.g., request) sensor data and probe data corresponding with a road work event location. One or more sensors 30 associated with and/or in communication with a vehicle apparatus 20 may gather, capture, record, and/or measure sensor information/data (e.g., vehicle sensor data, probe data and/or the like). One or more sensors 30 associated with or in communication with a sensing apparatus 60 (e.g., a mobile device) may gather, capture, record, and/or measure probe data. The vehicle apparatus 20 and/or sensing apparatus 60 may provide (e.g., transmit, send) the sensor data and/or probe data to the computing entity 10. The vehicle sensor data may comprise dynamic speed limit sign data (e.g., image data or information based at least in part on analysis of image data), location data, timestamp data, metadata or the like associated with the road work event location. The probe data may comprise location data (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, device identifier, user identifier, or the like), timestamp data, metadata or the like. The computing entity may receive and/or evaluate (e.g., analyze) the vehicle sensor data obtained from the vehicle apparatus 20. The computing entity 10 may receive and evaluate (e.g., analyze) the probe data obtained from the vehicle apparatus 20 and/or sensing apparatus 60. The computing entity 10 may determine, based at least in part on vehicle sensor data (e.g., dynamic speed limit sign data) corresponding with the road work event location, a road network speed profile. In some embodiments, the computing entity 10 may receive road network speed profile information corresponding with a road work event location from another remote computing entity. The computing entity 10 may determine, based at least in part on probe data corresponding with the road work event location, a probe speed profile. The computing entity 10 may determine a road work event confidence based at least in part on evaluation of the road network speed profile and the probe speed profile. The computing entity 10 may transmit an indication (e.g., a signal or a message) over the network 50 to one or more vehicle apparatuses 20 based at least in part on the determined road work event confidence. For example, the computing entity 10 may transmit an indication to one or more vehicle apparatuses 20 to cause publication of road work event information. Causing publication of the road work event information may comprise transmitting an indication to one or more remote devices/vehicle apparatuses 20 for presentation (e.g., display) or audible announcement in conjunction with a mapping or navigation system. In some embodiments, in response to determining that the road work event confidence fails to satisfy a threshold confidence, the computing entity 10 may cause deactivation of a road work event warning associated with the road work event location.

A road work event may be defined by a start location, an end location, a time period (e.g., start time and end time) and a road work type (e.g., construction, accident and/or the like). An example road work event location may be or comprise one or more points, lines (e.g., roads) or regions (e.g., polygons) corresponding with a geographical location on a map at which the road work event occurs and with which the road work event is otherwise associated. In one embodiment, a database 40 may store definitions of a plurality of regions bounded by respective polygons. Identifying a road work event location may comprise generating a polygon including the location with which the road work event is associated, such as by reference to the database 40. An example polygon may bound a region that comprises multiple roads within a corresponding portion of the map. A road work event can be defined by a time period during which a geographical location (e.g., at least a portion of a road or a portion of a region (e.g., polygon)) identified on a map is occupied for work (e.g., road surface repairs, construction, debris removal and/or the like). For example, a road work event occurring on at least a portion of a multi-lane road may result in one or more lanes being closed off and/or traffic merged into the remaining lanes for a time period. In some instances, an entire road (e.g., all of the lanes) may be closed for a time period. Road work event warnings corresponding with a location (e.g., a road) may be provided to drivers within a predetermined range of the road work event location. For example, road work event warnings may be provided in advance of the driver entering a region that includes the road work event location and during a time period associated with the road work event.

An example road work event may occur when an accident occurs and road debris from the crash needs to be cleared. The term static speed limit sign may refer to road signage such as warning signs and speed limit signs that may generally be present at a particular location and may not change based on a road work event. The term dynamic speed limit sign may refer to road work event signage such as warning signs, speed limit signs, lane closure signs, detour signs and/or the like that may be deployed in advance of a scheduled road work event or during a time period associated with an active (e.g., occurring) road work event event. Dynamic speed limit signs may subsequently be removed when the road work event is no longer active. Such dynamic speed limit signs may be configured (e.g., placed, modified, removed or the like) in the field during active road work events to provide indications of safe driving speeds and other information based on prevailing road conditions. However, in certain situations dynamic speed limit signs may no longer correspond with an active road work event. For example, dynamic speed limit signs may still be present (e.g., left behind) at a road work event location after the road work event has ended. In another example, dynamic speed limit signs may be placed in advance before the prospective (e.g., scheduled) road work event commences.

FIG. 3 provides a flowchart of operations 300 performed by the computing entity 10, to determine a road work event confidence, according to an example embodiment.

Beginning at block 301, the computing entity 10 includes means, such as a processor 12, a communication interface 16 and/or the like, for identifying a road work event location. For example, the computing entity 10 comprises means, such as the processor 12, the communication interface 16 and/or the like for receiving (e.g., ingesting) road work event information (e.g., a warning, notification and/or the like) from at least one remote source (e.g., remote computing entity, traffic service information provider, government source, news source and/or the like). The road work event information may comprise a location (e.g., a start location and end location, a distance, a region, geographic coordinates and/or the like), a time period, a road work event type (e.g., construction, accident and the like, road work event information (e.g., lane closure information) and/or the like. In various embodiments, the computing entity 10 may receive information regarding a scheduled or active road work event. The information may include at least a time period and a location of the prospective or active road work event and may include additional road work event information (e.g., closed lanes, traffic speed information and the like).

Subsequent to identifying the road work event location, at block 303, the computing entity 10 includes means, such as the processor 12, the communication interface 16 or the like, for obtaining vehicle sensor data (e.g., dynamic speed limit sign data) corresponding with the road work event location. For example, the computing entity 10 may comprise means, such as processor 12, the communication interface 16 and/or the like, for instructing the apparatus(es) 20, 60 to provide dynamic speed limit sign data from a location including or otherwise associated with the road work event location. In some embodiments, the computing entity 10 includes means for analyzing vehicle sensor data (e.g., image data) in order to determine dynamic speed limit sign data corresponding with the road work event location (e.g., pursuant to an image segmentation technique). In some embodiments, the computing entity 10 may receive information describing the dynamic speed limit data such as by obtaining results (e.g., metadata) corresponding with information/data analyzed by one or more vehicle apparatuses 20, sensing apparatuses 60 and/or remote computing entities.

In some embodiments, vehicle sensor data may be generated and/or transmitted from a separate remote computing device that aggregates data/information from a plurality of sources (e.g., vehicle apparatuses 20). In various embodiments, the computing entity 10, such as the processor 12, the communications interface 16 or the like, may transmit a request to one or more remote computing entities for vehicle sensor data/information (e.g., dynamic speed limit sign data) corresponding with the road work event location (e.g., obtain sensor data from a region that includes the location with which the respective road work event is associated). A remote computing entity may aggregate the vehicle sensor data/information (e.g., image data, vehicle sensor data, and/or the like) and transmit the vehicle sensor data/information to the computing entity 10. In some embodiments, the remote computing entity may continuously or repeatedly update (maintain) a database of vehicle sensor data received from vehicle apparatuses 20. In such embodiments, each record in the database 40 may be stored in association with a corresponding location and timestamp. The remote computing entity may receive as input a request for vehicle sensor data/information corresponding with a location such as a region (e.g., a polygon) that includes the road work event location from the computing entity 10. The remote computing entity may obtain and transmit the sensor data to the computing entity 10.

FIG. 4 provides a flowchart of operations 400 performed by an apparatus (e.g. vehicle apparatus 20, sensing apparatus 60 or the like), according to an example embodiment.

Starting at block 401, the apparatus(es) 20, 60 include means, such as the processor 22, the communication interface 26 or the like, for receiving a request for data (e.g., vehicle sensor data, probe data, image data and/or the like) from the computing entity 10 or other remote computing entity. The apparatus(es) 20, 60 may include one or more sensors 30 (e.g., vehicle sensors, probe sensors and/or the like) configured to obtain sensor data or probe data from a location (e.g., within a range of a road work event location). The one or more sensors 30 may include image sensor(s), LiDAR sensors and/or the like.

As noted above, an example vehicle apparatus 20 may be an in-vehicle navigation system, vehicle control system, a mobile computing device, and/or the like including one or more sensors 30 configured to obtain sensor data from a location (e.g., road work event location). More specifically, vehicle sensor data may be representative of road network information associated with a road work event location such as road sign information (e.g., dynamic and/or static speed limit sign data). For example, a vehicle apparatus 20 may be an in-vehicle navigation system mounted within and/or on-board a vehicle. In other embodiments, the vehicle apparatus 20 may be a smartphone, tablet, personal digital assistant (PDA), and/or other mobile computing device. Vehicle sensor data may include, without limitation, location data, (e.g. a latitudinal, longitudinal position, and/or height, GPS coordinates, proximity readings associated with a radio frequency identification (RFID) tag, or the like), device identifier, (e.g. vehicle identifier, user identifier, or the like), a timestamp associated with the vehicle sensor data, metadata or the like.

The sensing apparatus 60 may be or comprise a vehicle (e.g., specialized vehicle mapping equipment, autonomous vehicle, probe vehicle and/or the like) or computing device (e.g., mobile device, in-vehicle navigational device or the like) including one or more sensors 30 configured to obtain probe data from a location (e.g., road work event location). More specifically, probe data (e.g., collected by vehicle apparatus 20 or sensing apparatus 60) may be representative of the location of a vehicle at a respective point in time and may be collected while a vehicle is traveling along a route which includes the road work event location. While probe data is described herein as being vehicle probe data, example embodiments may be implemented with pedestrian probe data, or non-motorized vehicle probe data (e.g., from bicycles, scooters and the like). Similar to vehicle sensor data, probe data may also include, without limitation, geo-location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a timestamp associated with the probe data, metadata or the like.

At block 403, the apparatus(es) 20, 60 includes means, such as the processor 22, the communications interface 26 or the like, for transferring data to and receiving data from the computing entity 10. The apparatus(es) 20, 60 may transmit data/information (e.g., image data, vehicle sensor data, probe data and/or the like) to the computing entity 10. The data may comprise location data, image data, environmental data, metadata combinations thereof and/or the like.

Returning to FIG. 3, at block 307, the computing entity 10 includes means, such as the processor 12, the communication interface 16 or the like, for obtaining map data describing road segment geometry corresponding with the road work event location. The map data be or comprise geographic data and other information corresponding with the road work event location. The map data may be provided by one or more remote computing entities. In some embodiments, at least a portion of the map data may be stored locally by the computing entity 10.

At block 309, the computing entity 10 includes means, such as the processor 12, for map matching the dynamic speed limit sign data and the map data describing road segment geometry. For example, the computing entity 10 may associate dynamic speed limit sign data describing one or more dynamic speed limit signs present at a road work event location with locations (e.g., point, lines, areas, positions or the like) on a map.

At block 315, upon receipt of the map data and the dynamic speed limit sign data, the computing entity 10 includes means, such as the processor 12 for determining a road network speed profile (e.g., dynamic speed limit sign profile) corresponding with the road work event location. For example, the processor 12 may be configured to process the received information, such as by computer-executable instructions, that indicate which sensor information/data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized computer programming language, standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm. As noted above, in some embodiments, a remote computing entity or another provider may provide (e.g., transmit, send) at least a portion of the data to the computing entity 10. While the above example of determining a road network speed profile is described in relation to identifying dynamic speed limit signs, it should be understood that the present disclosure is not limited to the above example. Additionally and/or alternatively, a road network speed profile may be defined by lane closure information, detour information and/or the like.

In some embodiments, the computing entity 10 may determine the road network speed profile (e.g., a dynamic speed limit sign profile) based at least in part by map matching dynamic speed limit sign data obtained by at least one vehicle apparatus 20 or other sensing apparatus 60 with geographic data (e.g., map data describing road segment geometry) in order to associate instances of dynamic speed limit sign data with locations (e.g., point, lines, areas, positions or the like) on a map. In one example, image data may be received and analyzed pursuant to an image recognition technique or character recognition techniques in order to identify a displayed (e.g., posted) speed limit at a respective map matched location. Determining the road network speed profile may comprise determining speed limit information (e.g., a speed limit or speed range) for a plurality of road segments corresponding with the road work event location. Each road segment may be defined by a start location (e.g., point) at which a first dynamic speed limit sign is identified and an end location (e.g., point) at which a second dynamic speed limit sign is identified. The computing entity 10 may use a variety of algorithms and techniques such as, without limitation, a Hidden Markov Model (HMM), Kalman filtering techniques and/or the like to map match dynamic speed limit sign data and geographic data (e.g., map data). In some embodiments, instead of determining the road network speed profile information, the computing entity 10 may obtain (e.g., receive) road network speed profile information from one or more remote computing entities or providers.

FIG. 5 provides an example schematic 500 illustrating aspects of determining a road work confidence in relation to a road work event location by a computing entity 10. As noted above, the computing entity 10 may determine a road network speed profile by identifying dynamic speed limit sign data corresponding with a road work event location. The computing entity 10 may identify one or more road segments within or otherwise associated with the road work event location each defined by a particular speed limit or speed range. For example, a road segment may be defined by a start location (e.g., point, map link or the like) at which a dynamic speed limit sign is identified and an end location (e.g., point, map link or the like) at which another dynamic speed limit sign is identified or a location at which the initial dynamic speed limit sign is no longer active. As depicted in FIG. 5, for an example road work event location and corresponding road network speed profile, five dynamic speed limit signs 501, 503, 505, 507 and 509 are identified. A first dynamic speed limit sign 501 has a speed limit of "120". A second dynamic speed limit sign 503 has a speed limit of "100". A third dynamic speed limit sign 505 has a speed limit of "80". A fourth dynamic speed limit sign 507 has a speed limit of "60" and a fifth dynamic speed limit sign has a speed limit of "120." Based at least in part on the location of the dynamic speed limit signs 501, 503, 505, 507 and 509, a plurality of road segments may be identified. For example, as shown, a first road segment Ls is defined by a start location corresponding with the first dynamic speed limit sign 501 and an end location corresponding with the second dynamic speed limit sign 503. A second road segment Li is defined by a start location corresponding with the second dynamic speed limit sign 503 and an end location corresponding with the third dynamic speed limit sign 505. A third road segment Le is defined by a start location corresponding with the third dynamic speed limit sign 505 and an end location corresponding with the fourth dynamic speed limit sign 507. A fifth road segment Ln is defined by a start location corresponding with the fifth dynamic speed limit sign 509.

Returning to FIG. 3, at block 305, the computing entity 10 includes means, such as the processor 12, the communication interface 16 or the like, for obtaining probe data corresponding with the road work event location. As noted above, probe data may be collected through probes which collect data points in the form of an ordered sequence of GPS (global positioning system) locations where the vehicle has traveled and a time associated with each GPS location. As noted above, probe data may also include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a timestamp associated with the probe data, metadata or the like.

The computing entity 10, such as the processor 12, may be configured to receive and analyze probe data from one or more vehicle apparatuses 20 and/or sensing apparatuses 60 (e.g., mobile devices). In various embodiments, the probe data may be from a different source than the vehicle sensor data (e.g., dynamic speed limit sign data) described above. In this regard, the computing entity 10 may comprise means, such as processor 12, communications interface 16, and/or the like, for receiving and analyzing the received probe data. For example, the processor 12 may be configured to process the received probe data, such as by computer-executable instructions, that indicate which probe data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized computer programming language, standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm. The computing entity 10 may receive and evaluate (e.g., analyze) probe data obtained from one or more vehicle apparatuses 20 and/or sensing apparatuses 60 traversing a predetermined range of the road work event location (e.g., at least a portion of a road that is included within or otherwise associated with the road work event location) at a time that is associated with the road work event time period.

At block 311, the computing entity 10 includes means, such as the processor 12, the communication interface 16 or the like, for obtaining high-definition map data (e.g., geographic data) describing road geometry corresponding with the probe data in order to facilitate path-level map matching of the probe data and the geographic data. The computing entity 10 may use a variety of algorithms and techniques such as, without limitation, a Hidden Markov Model (HMM), Kalman filtering techniques and/or the like to map match probe data and geographic data.

Then, at block 313, subsequent to or in conjunction with determining or receiving the high-definition map data, the computing entity 10, includes means, such as the processor 12 for path map matching on lane level in order to associate instances of probe data with locations (e.g., positions) on a map.

At block 317, based at least in part on path map matching, the computing entity includes means, such as the processor 12, for determining a probe speed profile corresponding with the road work event location. As noted above, in various embodiments, the computing entity 10 may determine the probe speed profile based at least in part by map matching probe data obtained by at least one vehicle apparatus 20 or sensing apparatus 60 and geographic data (e.g., high definition map data describing road segment geometry) in order to associate instances of probe data with locations (e.g., positions) on a map. By map matching probe data with geographic data (high-definition map data describing road segment geometry), the computing entity 10 may accurately determine a path or route traversed by one or more vehicle apparatuses 20 and/or sensing apparatuses 60 (e.g., mobile devices, vehicles or the like) and other characteristics associated therewith (e.g., direction of travel, rate of travel and or the like). The computing entity 10 may use a variety of algorithms and techniques such as, without limitation, a Hidden Markov Model (HMM), Kalman filtering techniques and/or the like to map match the probe data and geographic data. The computing entity 10 may statistically correlate map matched probe points with geographic data. In so doing, the computing entity 10 may determine lane level information corresponding with the road work event location. For example, the computing entity 10 may, for a respective road segment, identify lane shifting, lane merging, narrow lanes, lane closures and the like.

Determining a Road Work Event Confidence

At block 319, upon determining the road network speed profile and the probe speed profile, the computing entity 10 comprises means, such as the processor 12 or the like, for evaluating the road network speed profile and the probe speed profile in order to determine (e.g., confirm) whether the road network speed profile and the probe speed profile corresponding with the road work event location satisfy a road work event confidence.

The computing entity 10 may determine the road work event confidence by correlating (e.g., comparing, matching or the like) probe data obtained by one or more vehicle apparatuses 20 and/or sensing apparatuses 60 traversing each respective road segment (corresponding with a road work event location at a time that is associated with the road work event time period) with the road network speed profile (e.g., based at least in part on dynamic speed limit sign data for each respective road segment). With reference to FIG. 5, the computing entity 10 may determine the probe speed profile for a road work event location by identifying whether, for a respective road segment Ls, Li, Le, Ln, the road network speed profile corresponds with (e.g., matches) the probe speed profile (e.g., based on probe data of one or more vehicle apparatuses 20 and/or sensing apparatuses 60 traversing the road segment at a time that is associated with the road work event time period). In various embodiments, determining that the road network speed profile and probe speed profile correspond may comprise determining that the road network speed profile and the speed limit profile exhibit comparable trends and/or comprise values within a predefined threshold or range of one another.

By way of example, a road network speed profile may indicate a first dynamic speed sign at a first location on a map indicating a speed limit of "120" that a second dynamic speed sign at a second location on the map indicating a speed limit of "60". If the computing entity 10 determines that a probe speed profile between the location of the first dynamic speed sign (indicating "120") and the location of the second dynamic speed sign (indicating "60") indicates that a vehicle apparatus 20 and/or sensing apparatus 60 traversing the road segment at a time associated with the road work event time period indicates a correspondingly decreasing vehicle speed between "120" and "60", then the computing entity 10 may determine that the road network speed profile and the probe speed profile correspond (e.g., match) between the location of the first dynamic speed sign and the second dynamic speed sign.

In another example, a road network speed profile may indicate a first dynamic speed sign at a first location on a map indicating a speed limit of "120" and a second dynamic speed sign at a second location on the map indicating a speed limit of "60". If the computing entity 10 determines that a probe speed profile between the location of the first dynamic speed sign (indicating "120") and the location of the second dynamic speed sign (indicating "60") indicates that a vehicle apparatus 20 and/or sensing apparatus 60 traversing the road segment at a time associated with the road work event time period indicates that the vehicle is maintaining a constant vehicle speed of "130", then the computing entity 10 may determine that the road network speed profile and the probe speed profile do not correspond (e.g., match).

The computing entity 10 may use as input, an ordered sequence of vehicle sensor data (e.g., location data, dynamic speed limit sign data and/or the like associated with a road network speed profile) sorted according to timestamp data and an ordered sequence of probe data (e.g., location data, direction of travel, rate of travel, timestamp data and/or the like associated with a probe speed profile) sorted according to timestamp data. Next, for each road segment (and/or associated probe points/map links) corresponding with a road work event location, the computing entity 10 compares the dynamic speed limit sign data and the probe data to determine whether the road network speed profile and the probe speed profile include one or more shared characteristics. For example, the computing entity 10 may determine whether road network speed profile characteristics (e.g., based at least in part on dynamic speed limit sign data) and probe speed profile characteristics indicate that the road network speed profile and probe speed profile associated with a respective road segment are within a predetermined range of one another. For each road segment, the computing entity 10 may assign a score or confidence value indicating a degree of correlation between the road network speed profile (e.g., dynamic speed limit sign data characteristics) and probe speed profile (e.g., probe data characteristics). For example, the computing entity 10 may assign a value of "1" if the road network speed profile characteristics and probe speed profile characteristics for a respective road segment are within a predetermined threshold/range of one another. The computing entity 10 may assign a value of "0" if the road network speed profile characteristics and probe speed profile characteristics for a respective road segment are not within a threshold/range of one another. By way of example, the computing entity 10 may determine that a road network speed profile (e.g., dynamic speed limit sign data associated with a road segment and/or probe point, map link or the like) and a probe speed profile associated with the road segment are sufficiently close or otherwise correlated with each other.

In some embodiments, the computing entity 10 may assign a high/positive road work event confidence value for a road segment in an instance in which the road network speed profile and the probe speed profile are determined to be within a predetermined threshold or range of one another. In some embodiments, the road work event confidence value for a road segment may be based at least in part on a ratio of apparatuses 20, 60 that are determined to have probe data characteristics within a predetermined threshold or range of one another and/or the road network speed profile.

Referring again to FIG. 5, the computing entity 10 may identify a plurality of road segments corresponding with the example road work event location. As noted above, a first road segment Ls is defined by a start location corresponding with the first dynamic speed limit sign 501 and an end location corresponding with the second dynamic speed limit sign 503. A second road segment Li is defined by a start location corresponding with the second dynamic speed limit sign 503 and an end location corresponding with the third dynamic speed limit sign 505. A third road segment Le is defined by a start location corresponding with the third dynamic speed limit sign 505 and an end location corresponding with the fourth dynamic speed limit sign 507. A fifth road segment Ln is defined by a start location corresponding with the fifth dynamic speed limit sign 509. For each respective road segment (Ls, Li, Ln and Le), the computing entity 10 may determine whether the road network speed profile characteristics (e.g., speed limit, speed range, direction and/or the like based at least in part on dynamic speed limit sign data) and the probe speed profile characteristics correspond.

For example, the computing entity 10 may determine that the first road segment Ls, is associated with a road network speed profile indicating a decreasing rate of travel (e.g., between "120" and "100") in a particular direction. Then, the computing entity 10 may determine whether the probe data obtained by one or more vehicle apparatus(es) 20 and/or sensing apparatus(es) traversing the first road segment Ls also indicates a decreasing rate of travel and/or in the same direction. If, in relation to the first road segment Ls, the computing entity 10 determines that the road network speed profile for the first road segment Ls is decreasing and the probe speed profile for the first road segment Ls is decreasing, for example, by being within a predetermined range of one another, then the computing entity 10 may determine that the road network speed profile and the probe speed profile for the first road segment Ls correspond. However, if the computing entity 10 determines that the probe speed profile is not decreasing (e.g., is constant), then the computing entity may determine that the road network speed profile and the probe speed profile for the first road segment Ls do not correspond.

The computing entity 10 may determine that the second road segment Li, is associated with a road network speed profile indicating a decreasing rate of travel (e.g., between "100" and "80") in a particular direction. Then, the computing entity 10 may determine whether the probe data obtained by one or more vehicle apparatus(es) 20 and/or sensing apparatus(es) traversing the second road segment Li also indicates a decreasing rate of travel and/or in the same direction. If, in relation to the second road segment Li, the computing entity 10 determines that the road network speed profile for the second road segment Li is decreasing and the probe speed profile for the second road segment Li is decreasing, for example, by being within a predetermined range of one another, then the computing entity 10 may determine that the road network speed profile and the probe speed profile for the second road segment Li correspond. However, if the computing entity 10 determines that the probe speed profile is not decreasing (e.g., is constant), then the computing entity may determine that the road network speed profile and the probe speed profile for the second road segment Li do not correspond.

The computing entity 10 may determine that the third road segment Le, is associated with a road network speed profile indicating a decreasing rate of travel (e.g., between "80" and "60") in a particular direction. Then, the computing entity 10 may determine whether the probe data obtained by one or more vehicle apparatus(es) 20 and/or sensing apparatus(es) traversing the third road segment Le also indicates a decreasing rate of travel and/or in the same direction. If, in relation to the third road segment Le, the computing entity 10 determines that the road network speed profile for the third road segment Le is decreasing and the probe speed profile for the third road segment Le is decreasing, for example, by being within a predetermined range of one another, then the computing entity 10 may determine that the road network speed profile and the probe speed profile for the third road segment Le correspond. However, if the computing entity 10 determines that the probe speed profile is not decreasing (e.g., is constant), then the computing entity may determine that the road network speed profile and the probe speed profile for the third road segment Le do not correspond.

The computing entity 10 may determine that the fourth road segment Ln, is associated with a road network speed profile indicating an increased rate of travel (e.g., "120") in a particular direction. Then, the computing entity 10 may determine whether the probe data obtained by one or more vehicle apparatus(es) 20 and/or sensing apparatus(es) traversing the fourth road segment Ln also indicates a decreasing rate of travel and/or in the same direction. If, in relation to the fourth road segment Ln, the computing entity 10 determines that the road network speed profile for the third road segment Le is increasing and the probe speed profile for the fourth road segment Ln is decreasing, for example, by being within a predetermined range of one another, then the computing entity 10 may determine that the road network speed profile and the probe speed profile for the fourth road segment Ln correspond. However, if the computing entity 10 determines that the probe speed profile is not increasing (e.g., is decreasing instead), then the computing entity may determine that the road network speed profile and the probe speed profile for the fourth road segment Ln do not correspond.

In some embodiments, The computing entity 10 may include means, such as the processor 12, for aggregating probe data for a plurality of vehicle apparatuses 20 and/or sensing apparatuses 60 traversing a respective road segment (Ls, Li, Le, Ln) during a time period or window of time. As described above, the probe data may include vehicle speed data, timestamp data, location data, direction of travel, rate of travel and/or the like associated with each respective road segment Ls, Li, Le and Ln.

Referring now to FIG. 6, an example schematic illustrating a road network speed profile and probe speed profile overlay is provided. As depicted, the x-axis corresponds with a plurality of instances in time and the y-axis corresponds with a road network speed profile (e.g., speed limit and corresponding location). As shown, a plurality of probe data points (each obtained from a respective vehicle apparatus 20 or sensing apparatus 60) each indicate a respective vehicle speed. A comparison between the road network speed profile (e.g., based on dynamic speed limit sign data) and the probe speed profile indicate that for a particular road segment (between a first dynamic speed limit sign of 80 kilometer per hour at distance 8 and 80 kilometers per hour at distance 13) indicate that there is an active road work event that occurred during the time period depicted (e.g., between 6 am and 12 am on a particular day). As such, it can be inferred that the road network speed profile and probe speed profile for the illustrated time period correspond.

Returning to FIG. 5, in some embodiments, based on the analysis, the computing entity 10 may assign a confidence value for each of the road segments Ls, Li, Le and Ln. Then, the computing entity 10 may aggregate the confidence values for each of the road segments Ls, Li, Le and Ln (and/or probe points/map links or the like) associated therewith, corresponding with a road work event location.

With reference to FIG. 5, discussed above, an example technique for determining a road work event confidence based at least in part on evaluation of the road network speed profile and the probe speed profile is provided below. However, the scope of the present disclosure is not limited to the example provided below and various embodiments may comprise the use of various other techniques.

```
Input: P, a sorted list of a vehicle's path probe points by
    GPS timestamp,
    Q, a sorted list of speed limit sign data by speed limit
      sign ID and GPS timestamp.
Output: List of links
Ls: start link of speed limit sign speed decreasing from
    normal speed in front of road works zone
Li: links in between Ls and Le
Le: end link of speed limit sign speed decreasing to
    minimum speed reach to road works zone
Ln: road works end link where speed limit sign speed
    back to normal speed
# RW is a list include all links between Le and Ln are road
    works links
RW=[ ]
Confidence=0
Step 1: if Q.size=0 return null
    for each speed limit sign data in Q:
      map match Q[i]
      decide Ls, Le, Ln
      Insert link into RW if it is in between Le and Ln
Step 2: if P.size=0 return null
    for each probe point in P:
      path map match p[i]
        a: check if the probe speed profile is aligned speed
           limit sign speed profile on the same link, update
           confidence value
        b: if the map matched link is in between Le and
           Ln, check driving lane changes to detect the
           lane shifting, lane merging or narrow lane by
```

statistical calculating map matched probe point on lane location, update lane number affected by road works return [] if confidence value<threshold:else: RW[all road works links]

At block 321, the computing entity 10 comprises means, such as the processor 12 or the like, for determining whether the road work event confidence satisfies a confidence threshold in order to verify the road work event (e.g., determine whether or not the road work event should be published) such as by aggregating confidence values for a plurality of road segments and associated probe points/map links. For example, the computing entity 10, such as the processor 12, may set a road work event confidence threshold of 90%, and as a result, require a road work event confidence that satisfies the threshold, such as by equaling or being above the threshold (e.g., 90%), in order to publish the road work event information, so as to verify or validate the road work event. The computing entity 10 may require that a majority of determined confidence values associated with a comparison of probe data profiles and road network speed profiles corresponding with a road work event are positive (e.g., equal to "1") or above a threshold confidence value.

Then, at block 323, the computing entity 10, comprises means such as the processor 12, communication interface 16, and/or the like, for causing transmission (e.g., publication) of verified road work event information based at least in part on the road work event confidence (e.g., if the road work event confidence satisfies a road work event confidence threshold). The road work event information may comprise detailed information associated with the road work event location (e.g., lane level information, indications of road objects, current speed limit information and/or the like). Publication of the road work event information may have any of various forms and, in one embodiment, may comprise a message or indication transmitted to the vehicle apparatus(es) 20 or provided in conjunction with the navigation or mapping system. In some embodiments, the computing entity 10, such as the processor 12, may provide instructions or other information causing a stored road work event entry to be provided, such as by causing stored computer instructions to be executed to generate the warning. An updated map may be provided or transmitted to the one or more vehicle apparatuses 20. For example, the computing entity 10 comprises means, such as the processor 12, communications interface 16, and/or the like, for providing the updated map. For example, the updated map illustrating the location at which the road work event was generated may be provided and/or transmitted to a plurality of vehicle apparatuses 20 via the network 50. Based upon the updated map and the indication associated with a location corresponding with a road work event location, a road work event may be presented to the driver of the vehicle, such as by the display associated with a navigation or mapping system in which a reference to a road work event is associated with a location on a map, audibly via a vehicle entertainment system or the like. In some embodiments, once the computing entity 10 has provided the instructions regarding a road work event, the road work event may be presented to the vehicle and/or the driver of the vehicle in all instances. Alternatively, the road work event may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location. In some embodiments, the road work event information may be provided for use in conjunction with an autonomous driving system. In various embodiments, the road work event information may be taken into account in a navigation system and/or autonomous driving system, such as, for example without limitation, by defining a route that avoids or does not otherwise include the road work event location or adjusting the estimated time of arrival based on the road work event information. In some embodiments, causing transmission of the verified road work information may comprise causing an autonomous vehicle to proceed in a lane that remains open and/or subject to a reduced speed limit in a vicinity of the road work event. In some embodiments, causing transmission of verified road work event information may comprise transmitting an indication and/or instructions to cause a road work event warning to continue to be published (e.g., remain active).

Alternatively, at block 325, the computing entity 10 comprises means such as processor 12, communication interface 16, and/or the like, for causing deactivation of a road work event warning based at least in part on the road work event confidence (e.g., in an instance in which the road work event confidence fails to satisfy a road work event confidence threshold). For example, the computing entity 10 may transmit instructions to deactivate a road work event warning that has been published or that is otherwise active.

Vehicle Apparatus Operation

As discussed above, FIG. 4 provides a flowchart of operations performed by a vehicle apparatus 20 in communication with the computing entity 10. The vehicle apparatus 20 may be configured to transmit and/or receive information from the computing entity 10, such as by receiving instructions from the computing entity 10. The vehicle apparatus 20 may be configured to utilize or subscribe to a system or application (e.g., a mapping system, navigation system or weather alert system) provided by or otherwise supported by the computing entity 10. The example mapping system may comprise computer-executable instructions embedded therein. When the vehicle apparatus 20, on-board a vehicle, traverses within the specified range of a location corresponding with a road work event, computer-executable instructions embedded in or associated with the map may be executed to cause publication of the road work event.

The vehicle apparatus 20 may include means, such as the processor 22, for initializing the mapping system or navigation system (e.g. a user may launch an application on a computing device comprising an interactive map). The interactive map, or portions thereof, may be received (e.g. from the computing entity which may, in some embodiments be remote from the vehicle apparatus 20) and stored by the vehicle apparatus 20, such as in memory 24. In some embodiments, the computing entity 10, such as the processor 12, the communication interface 16 or the like, may transmit instructions for updating a copy of the interactive map stored by the vehicle apparatus 20. The interactive map may comprise computer-executable instructions embedded therein or otherwise associated therewith. For example, the vehicle apparatus 20 may comprise means, such as processor 22, memory 24, communications interface 26, and/or the like, for receiving, storing and/or updating the interactive map.

In various embodiments, the vehicle apparatus 20 may be determined to be within a specified range of a location corresponding with a road work event associated with one or more geographical points, lines or areas, e.g., polygons, of the map. The vehicle apparatus 20 may be, for example, following a route or a predicted route that passes within the specified range of the location corresponding with the road work event represented by one or more geographical points, lines or areas on the map.

In some embodiments, the computer-executable instructions may comprise a reference to a function repository stored in association with the map. For example, the function repository may be a reference table, a serialized file, a database, and/or the like. In an example embodiment, the computer-executable instructions may comprise a reference to a function repository stored in the association with the map and one or more coefficients or parameters that are to be used in the calculation or determination of the result of the referenced instructions, function(s), or algorithm(s). In such an embodiment, the referenced instructions, function (s), and/or algorithm(s) may be retrieved and/or accessed from the function repository. For example, the vehicle apparatus 20 may be configured to retrieve and/or access instructions, function(s), and/or algorithm(s) referenced by the computer-executable instructions embedded in the map, from the function repository. For example, the vehicle apparatus 20 may comprise means, such as processor 22, memory 24, and/or the like, for retrieving and/or accessing instructions, function(s), and/or algorithm(s) referenced by the computer-executable instructions, such as the instructions embedded in the map, e.g., a link data record of the map, from the function repository. In some embodiments, the function repository may comprise different instructions based on different road design rules for different countries or geographical or political regions and/or the conventions thereof. In further embodiments, the function repository may consist of different instructions based on the type of vehicle being driven, the time of day, current velocity, and/or the like.

In some example embodiments, the vehicle apparatus 20 may comprise factory programmed instructions, function(s), algorithm(s), and/or the like (e.g., stored in memory 24) that may be defined for global usage (e.g., not defined to be unique with respect to a particular road segment or link) and the embedded computer-executable instructions may comprise one or more coefficients or parameters that are to be used in the calculation or determination of the result of the factory programmed instructions, function(s), or algorithm (s). For example, the factory programmed instructions, function(s), or algorithm(s) may comprise use of sensor information/data collected, captured, gathered, measured, and/or the like by a first sensor of the one or more sensors 30. The embedded computer-executable instructions may cause the vehicle apparatus 20, such as the processor 22, to analyze the sensor information/data differently along a respective portion of the map than is provided by the factory programmed instructions, function(s), or algorithm(s).

The vehicle apparatus 20 may be configured to transmit a response that includes or is otherwise based on the sensor data. The computer-executable instructions may be executed by the processor 22 to cause analysis of at least a portion of the sensor information/data collected, captured, gathered, measured, and/or the like by the one or more sensors 30 as the vehicle traversed the road segment that passes within a specified range of a location corresponding with a road work event and transmission of a response. A response may be transmitted via the network 50, such as to the computing entity 10. For example, the vehicle apparatus 20 comprises means, such as the processor 22, communications interface 26, and/or the like, for providing a response including, in some embodiments, the sensor data and location data indicating the location at which the sensor data was collected (and, in some instances) a time stamp indicating the time at which the sensor data was collected. In example embodiments, the computing entity 10 may be configured to receive the response from the vehicle apparatus 20. In example embodiments, a response may comprise the sensor data and/or an indication of a result of the analysis of sensor information/data that was caused by execution of the computer-executable instructions embedded in or associated with the map corresponding to the particular portion of the map (e.g. location corresponding with road work event).

Additionally, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the computing entity 10, such as the processor 12, may determine and execute computer-executable instructions that are adapted to analyze the sensor data in a manner that is tailored for a particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular portions of the map may be adapted or optimized for a particular vehicle type, make, model, trim package, year, and/or the like and/or a particular sensor configuration associated with the vehicle apparatus 20.

In various embodiments, a response may comprise various other information/data associated with the vehicle and/or the vehicle apparatus 20; the result of the analysis caused by the execution of the computer-executable instructions; the result of the analysis caused by factory programmed instructions, functions, or algorithms; and/or the like, as appropriate for the application.

The vehicle apparatus 20 may include means, such as the processor 22, the communications interface 26 or the like, for receiving a message to cause publication of a road work event, from the computing entity 10. In an example embodiment, the message may comprise an update to the interactive map/mapping system, a warning message/alert and/or the like. Based upon the message including, for example, an updated map, associated with a location, a road work event may be presented to the driver of the vehicle, such as by the display associated with a navigation or mapping system, audibly via a vehicle entertainment system or the like. Once the vehicle apparatus 20 has received the message to cause publication of a road work event, the road work event may be presented to the vehicle and/or the driver of the vehicle in all instances. Alternatively, the road work event may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location. As noted above, in various embodiments, the road work event information may be taken into account in a navigation system and/or autonomous driving system, such as, for example without limitation, by defining a route that avoids or does not otherwise include the road work event location or adjusting the estimated time of arrival based on the road work event information. In some embodiments, causing transmission of the verified road work information may comprise causing an autonomous vehicle to proceed in a lane that remains open and/or subject to a reduced speed limit in a vicinity of the road work event.

III. Example Apparatuses

The vehicle apparatus 20, sensing apparatus 60 and/or computing entity 10 of an example embodiment may be embodied by or associated with a variety of computing devices. The vehicle apparatus 20 may be embodied, for example, by a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. The computing entity 10 may be embodied in other types of computing devices, such as a server, a personal computer, a computer workstation, a laptop computer, a plurality of networked computing devices or the like, that are configured to identify a location corresponding with a road work event and to provide an indication in an instance in which a vehicle is near a location corresponding with a road work event or has a route that extends through the location.

In this regard, FIG. 2A depicts a computing entity 10 and FIG. 2B depicts a vehicle apparatus 20 or a sensing apparatus 60 of an example embodiment that may be embodied by various computing devices including those identified above. As shown, the computing entity 10 of an example embodiment may include, may be associated with or may otherwise be in communication with a processor 12 and a memory device 14 and optionally a communication interface 16 and/or a user interface 18. Similarly, a vehicle apparatus 20 or a sensing apparatus 60 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus 20 or sensing apparatus 60 to determine one or more features of the corresponding apparatus' surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the computing entity 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The computing entity 10, sensing apparatus 60 and/or the vehicle apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface 16, 26 may include, for example, an antenna (or multiple antennas) and supporting hardware and/or software for enabling communications with a wireless communication network. Additionally or alternatively, the communication interface 16, 26 may include the circuitry for interacting with the antenna(s) to cause transmission of signals via the antenna(s) or to handle receipt of signals received via the antenna(s). In some environments, the communication interface 16, 26 may alternatively or also support wired communication. As such, for example, the communication interface may include a communication modem and/or other hardware/software for supporting communication via cable, digital subscriber line (DSL), universal serial bus (USB) or other mechanisms.

In addition to embodying the computing entity 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the computing entity 10 may be configured to modify, update, and/or the like one or more data records of the geographic database.

In an example embodiment, the data records represent and comprise road networks, roads, streets, paths and the like, such as used by vehicles, cars, and/or other entities. The roads, streets, and the like may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the computing entity 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, 60 method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for determining a road work event confidence, the method comprising:

receiving an indication of an active road work event, wherein the indication of the active road work event comprises a time period and a location of the active road work event;

determining a road network speed profile corresponding with a geographical location that is associated with the active road work event, wherein the road network speed profile comprises dynamic speed limit sign data that is based on image analysis of vehicle sensor data, wherein the dynamic speed limit sign data identifies a dynamic speed limit sign associated with a start location of the active road event and in a circumstance in which another dynamic speed limit sign is identified, the dynamic speed limit sign data identifies another dynamic speed limit sign associated with an end location of the active road work event, and in a circumstance in which another dynamic speed limit sign is not identified, the dynamic speed limit sign data identifies a location at which the dynamic speed limit sign is no longer active;

determining, based at least in part on probe data corresponding with the geographical location, lane level information for a plurality of lanes associated with the road work event; wherein the lane level information comprises a lane event type such that respective ones of the plurality of lanes are assigned one of a plurality of lane event types comprising at least a lane shift, a lane merge, a narrow lane, or a lane closure, wherein each instance of the probe data comprises a timestamp within a time period that is associated with the active road work event;

determining, based at least in part on the lane level information, a probe speed profile;

determining the road work event confidence based at least in part on evaluation of the road network speed profile and the probe speed profile;

determining, based at least in part on the probe data corresponding with the geographical location, a lane that is subject to a reduced speed limit in a vicinity of the road work event;

in response to determining that the road work event confidence satisfies a predetermined threshold, causing transmission of road work event information corresponding with the active road work event for display by a user interface, the road work event information comprising at least the lane that is subject to the reduced speed limit in the vicinity of the road work event, the start location of the road work event at which the dynamic speed limit sign is identified, and in the circumstance in which another dynamic speed limit sign is identified, the end location of the road work event and in the circumstance in which another dynamic speed limit sign is not identified, a location at which the dynamic speed limit sign is identified to no longer be active;

and causing, based, at least in part, upon the transmission of the road work event information, an autonomous vehicle to proceed in the lane that is subject to the reduced speed limit in the vicinity of the active road work event.

2. The computer-implemented method of claim 1, wherein the evaluation of the road network speed profile and the probe speed profile comprises:

identifying a plurality of road segments corresponding with the active road work event; and assigning a value indicating a degree of correlation between the road network speed profile characteristics and probe data characteristics for each respective road segment.

3. The computer-implemented method of claim 2, wherein the probe data characteristics comprises one or more of geolocation data, heading data, or speed data.

4. The computer-implemented method of claim 1, wherein determining the lane level information further comprises map matching at least a portion of the probe data with geographic data using a Hidden Markov Model (HMM) or Kalman filtering.

5. The computer-implemented method of claim 1, further comprising:

in response to determining that the road work event confidence fails to satisfy a threshold confidence, causing deactivation of the road work event warning associated with the active road work event.

6. The computer-implemented method according to claim 1, wherein the evaluation of the road network speed profile and the probe speed profile comprises identifying a plurality of road segments corresponding with the active road work event, and wherein determining the road work event confidence comprises aggregating confidence values for the plurality of road segments and basing the road work event confidence upon a combination of the confidence values for the road segments.

7. An apparatus configured to determine a road work event confidence, the apparatus comprising processing circuitry and at least one memory including computer program code instructions, the computer program code instructions configured to, when executed by the processing circuitry, cause the processing circuitry to:

receive an indication of an active road work event, wherein the indication of the active road work event comprises a time period and a location of the active road work event;

determine a road network speed profile corresponding with a geographical location that is associated with the active road work event, wherein the road network speed profile comprises dynamic speed limit sign data that is based on image analysis of vehicle sensor data, wherein the dynamic speed limit sign data identifies a dynamic speed limit sign associated with a start location of the active road event and in a circumstance in which another dynamic speed limit sign is identified, the dynamic speed limit sign data identifies another dynamic speed limit sign associated with an end location of the active road work event, and in a circumstance in which another dynamic speed limit sign is not identified, the dynamic speed limit sign data identifies a location at which the dynamic speed limit sign is no longer active;

determine, based at least in part on probe data corresponding with the geographical location, lane level information for a plurality of lanes associated with the road work event, wherein the lane level information comprises a lane event type such that respective ones of the plurality of lanes are assigned one of a plurality of lane event types comprising at least a lane shift, a lane merge, a narrow lane, or a lane closure, wherein each instance of the probe data comprises a timestamp within a time period that is associated with the active road work event:

determine, based at least in part on probe data corresponding with the geographical location and the lane level information, a probe speed profile;

determine the road work event confidence based at least in part on evaluation of the road network speed profile and the probe speed profile;

determine, based at least in part on the probe data corresponding with the geographical location, a lane that is subject to a reduced speed limit in a vicinity of the road work event;

in response to determining that the road work event confidence satisfies a predetermined threshold, cause transmission of road work event information corresponding with the active road work event for display by a user interface, the road work event information comprising at least the lane that is subject to the reduced speed limit in the vicinity of the road work event, the start location of the road work event at which the dynamic speed limit sign is identified, and in the circumstance in which another dynamic speed limit sign is identified, the end location of the road work event and in the circumstance in which another dynamic speed limit sign is not identified, a location at which the dynamic speed limit sign is identified to no longer be active;

and cause, based, at least in part, upon the transmission of the road work event information, an autonomous vehicle to proceed in the lane that is subject to the reduced speed limit in the vicinity of the active road work event.

8. The apparatus according to claim 7, wherein the processing circuitry is caused to evaluate the road network speed profile and the probe speed profile by:

identifying a plurality of road segments corresponding with the active road work event; and assigning a value indicating a degree of correlation between the road network speed profile characteristics and probe data characteristics for each respective road segment.

9. The apparatus according to claim 8, wherein the probe data characteristics comprise one or more of geolocation data, heading data, speed data or speed data.

10. The apparatus according to claim 7, wherein determining the lane level information further comprises map matching at least a portion of the probe data with geographic data using a Hidden Markov Model (HMM) or Kalman filtering.

11. The apparatus according to claim 7, wherein the apparatus is caused to:

in response to determining that the road work event confidence fails to satisfy a threshold confidence, cause deactivation of a road work event warning associated with the active road work event.

12. The apparatus according to claim 7, wherein the evaluation of the road network speed profile and the probe speed profile comprises identifying a plurality of road segments corresponding with the active road work event, and wherein the computer program code instructions are further configured to, when executed by the processing circuitry, cause the processing circuitry to determine the road work event confidence by aggregating confidence values for the plurality of road segments and basing the road work event confidence upon a combination of the confidence values for the road segments.

13. A computer program product configured to determine a road work event confidence, the computer program product comprising at least one non-transitory computer readable storage medium having computer executable program code instructions therein, the computer executable program code instructions comprising program code instructions configured, upon execution, to:

receive an indication of an active road work event, wherein the indication of the active road work event comprises a time period and a location of the active road work event;

determine a road network speed profile corresponding with a geographical location that is associated with the active road work event, wherein the road network speed profile comprises dynamic speed limit sign data that is based on image analysis of vehicle sensor data, wherein the dynamic speed limit sign data identifies a dynamic speed limit sign associated with a start location of the active road event and in a circumstance in which another dynamic speed limit sign is identified, the dynamic speed limit sign data identifies another dynamic speed limit sign associated with an end location of the active road work event, and in a circumstance in which another dynamic speed limit sign is not identified, the dynamic speed limit sign data identifies a location at which the dynamic speed limit sign is no longer active;

determine, based at least in part on probe data corresponding with the geographical location, lane level information for a plurality of lanes associated with the road work event, wherein the lane level information comprises a lane event type such that respective ones of the plurality of lanes are assigned one of a plurality of lane event types comprising at least a lane shift, a lane merge, a narrow lane, or a lane closure, wherein each instance of the probe data comprises a timestamp within a time period that is associated with the active road work event;

determine, based at least in part on the lane level information, a probe speed profile;

determine the road work event confidence based at least in part on evaluation of the road network speed profile and the probe speed profile;

determine, based at least in part on the probe data corresponding with the geographical location, a lane that is subject to a reduced speed limit in a vicinity of the road work event;

in response to determining that the road work event confidence satisfies a predetermined threshold, cause transmission of road work event information corresponding with the active road work event for display by a user interface, the road work event information comprising at least the lane that is subject to the reduced speed limit in the vicinity of the road work event, the start location of the road work event at which the dynamic speed limit sign is identified, and in the circumstance in which another dynamic speed limit sign is identified, the end location of the road work event and in the circumstance in which another dynamic speed limit sign is not identified, a location at which the dynamic speed limit sign is identified to no longer be active;

and cause, based, at least in part, upon the transmission of the road work event information, an autonomous vehicle to proceed in the lane that is subject to the reduced speed limit in the vicinity of the active road work event.

14. The computer program product according to claim 13, wherein the program code instructions configured to evaluate the road network speed profile and the probe speed profile further comprise instructions configured upon execution, to:

identify a plurality of road segments corresponding with the active road work event; and assign a value indicating a degree of correlation between the road network speed profile characteristics and probe data characteristics for each respective road segment.

15. The computer program product according to claim 14, wherein the probe data characteristics comprise one or more of geolocation data, heading data, speed data or speed data.

16. The computer program product according to claim 13, wherein determining the lane level information further comprises map matching at least a portion of the probe data with geographic data using a Hidden Markov Model (HMM) or Kalman filtering.

17. The computer program product according to claim 13, wherein the evaluation of the road network speed profile and the probe speed profile comprises identifying a plurality of road segments corresponding with the active road work event, and wherein the computer executable program code instructions further comprise program code instructions configured to determine the road work event confidence by aggregating confidence values for the plurality of road segments and basing the road work event confidence upon a combination of the confidence values for the road segments.

* * * * *